United States Patent [19]

Maekawa

[11] Patent Number: 4,840,423
[45] Date of Patent: Jun. 20, 1989

[54] FRONT BODY STRUCTURE OF A MOTORCAR

[75] Inventor: Yoshihiro Maekawa, Higashihiroshima, Japan

[73] Assignee: Mazda Motor Corporation, Hiroshima, Japan

[21] Appl. No.: 174,884

[22] Filed: Mar. 29, 1988

[30] Foreign Application Priority Data

Mar. 31, 1987 [JP] Japan .................... 62-80605

[51] Int. Cl.⁴ ............................................. B62D 21/02
[52] U.S. Cl. .................... 296/194; 296/203; 180/89.19
[58] Field of Search ............... 296/194, 203, 204, 205, 296/29, -185; 180/89.16, 89.19

[56] References Cited

U.S. PATENT DOCUMENTS

| | | | |
|---|---|---|---|
| 1,852,464 | 4/1932 | Leipert | 180/89.16 |
| 2,668,722 | 2/1954 | Muller | 296/203 X |
| 3,055,699 | 9/1962 | May | 180/89.19 X |
| 4,440,435 | 4/1984 | Norlin | 296/194 X |

FOREIGN PATENT DOCUMENTS

| | | | |
|---|---|---|---|
| 748379 | 4/1933 | France | 296/205 |
| 987481 | 4/1951 | France | 296/203 |
| 1486428 | 6/1967 | France | 180/89.19 |
| 57-159880 | 10/1982 | Japan . | |

Primary Examiner—Johnny D. Cherry
Assistant Examiner—Brian Sells
Attorney, Agent, or Firm—Wenderoth, Lind & Ponack

[57] ABSTRACT

A front body structure of a cab-over type motorcar includes a front cross member extending transversely in the fore end of the car body, a pair of side sills longitudinally arranged along the side ends of the floor and a pair of front pillars extending vertically at the front side portions of the body. The lower portion of each front pillar is bifurcated into a fore branch connected at its lower end to the front cross member and a rear branch connected at its lower end to the side sill. Each of a pair of front tires is disposed between the fore and rear branches of the front pillar. With this construction, the front body of the structure has an increased rigidity and a large strength against shock imparted thereto.

30 Claims, 4 Drawing Sheets

FRONT BODY STRUCTURE OF A MOTORCAR

BACKGROUND OF THE INVENTION

1. Field of the Invention

The present invention relates to a front body structure of a motor vehicle such as a motorcar and more particularly to a front structure of a cab-over type motorcar in which front seats are disposed above an engine.

2. Description of the Prior Art

In a conventional cab-over type motorcar, a front pillar in the form of a single rod extends at each front side of a body generally downwardly from a roof end and is connected at its lower end to a rigid member constituting a lower part of the body. An example of such a structure is disclosed in Japanese Laid-Open Utility Model No. 159880/82.

If the conventional structure as described above is employed for a cab-over type motorcar having a forwardly elongated nose, it follows that the front pillar in the form of a single rod is also elongated forwardly. However, a problem arises in that the mechanical strength of the fore part of the car body is reduced.

SUMMARY OF THE INVENTION

The present invention has been accomplished with the foregoing problem inherent to the conventional structure in mind, and the object of the invention is to provide a front body structure of a cab-over type motorcar which has an increased rigidity as well as an increased strength against shock.

To accomplish the above object, the present invention provides a front body structure of a cab-over type motorcar in which a front seat is mounted on a floor at a position above an engine. The front body structure includes a front cross member extending in the transverse direction of the car body at the fore end thereof, a pair of side sills extending in the longitudinal direction of the car body along the respective side ends of the floor, and a pair of front pillars extending in the vertical direction of the car body at the respective front side portion thereof. The lower portion of each front pillar is bifurcated in the longitudimal direction of the car body into a fore branch and a rear branch, the fore branch being connected at the lower end thereof to the front cross member while each rear branch is connected at the lower end thereof to each side sill. The structure further includes a pair of front tires, each of which is disposed between the fore and rear branches.

Since the lower portion of each of the front pillars is bifurcated in the longitudinal direction of car body, and the fore branch is connected to the front cross member serving as a rigid member while the rear branch is connected to the side sill serving also as a rigid member, a rigidity of the front pillars is increased. Consequently, the front portion of the car body has an increased rigidity as well as an increased strength against shock.

Other objects, features and advantages of the present invention will become readily apparent from a reading of the following description which has been made with reference to the accompanying drawings.

BRIEF DESCRIPTION OF THE DRAWINGS

The present invention will be illustrated in the following drawings in which.

DESCRIPTION OF THE PREFERRED EMBODIMENT

Now, the present invention will be described in a greater detail hereunder with reference to FIGS. 1 to 9 which illustrate a preferred embodiment thereof.

Figure 1:
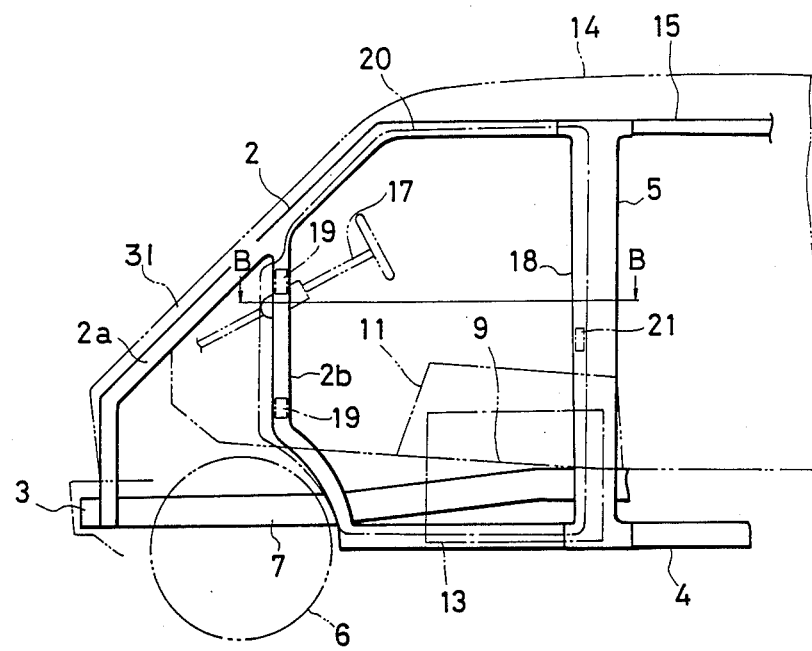
FIG. 1 is a schematic side view illustrating a front body structure of a cab-over type motorcar in accordance with an embodiment of the present invention.
Figure 2:
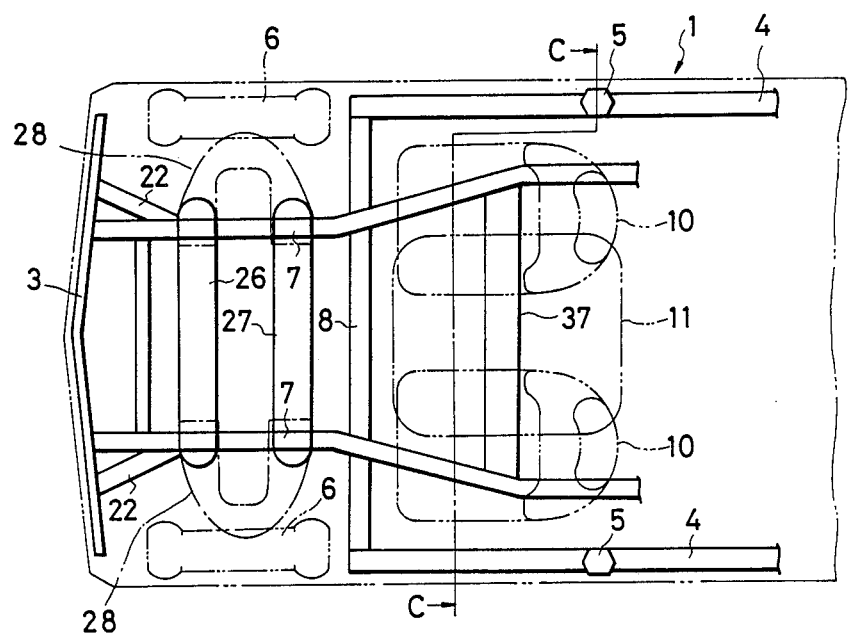
FIG. 2 is a schematic plan view thereof.
Figure 3:
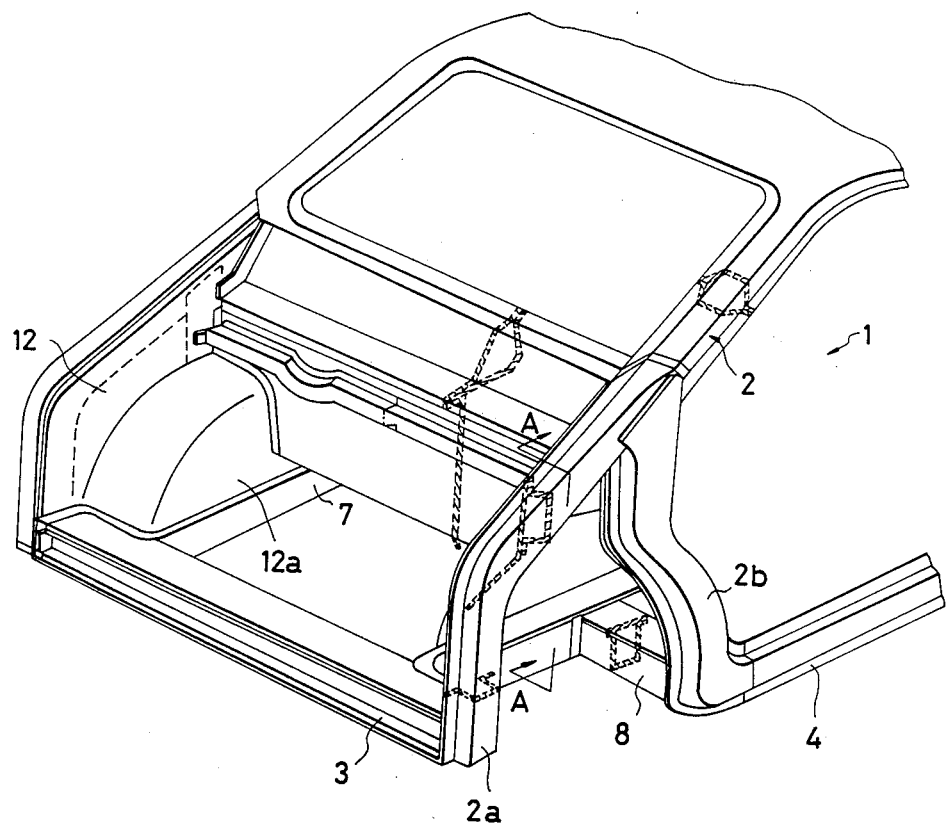
FIG. 3 is a perspective view illustrating various parts of the structure.
Figure 4:
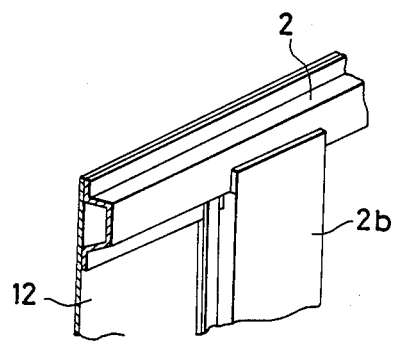
FIG. 4 is a fragmental perspective view of a bifurcated portion on a front pillar.
Figure 5:
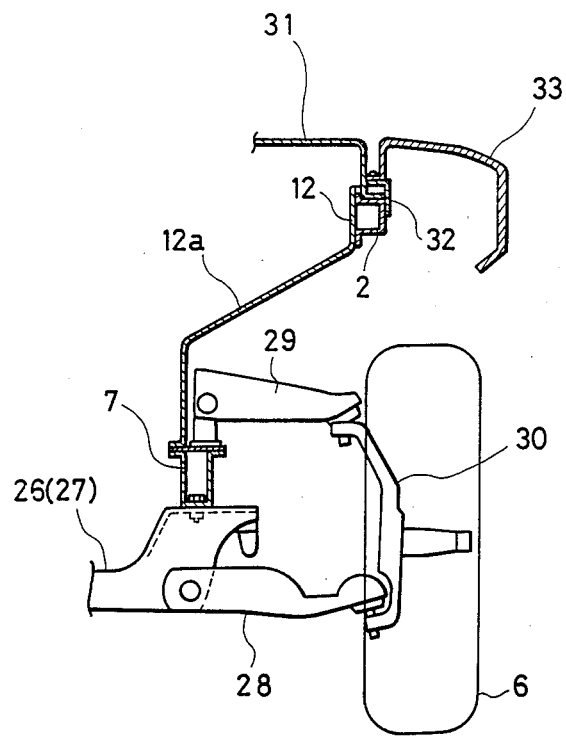
FIG. 5 is a sectional view of the structure taken along line A—A in FIG. 3.
Figure 6:
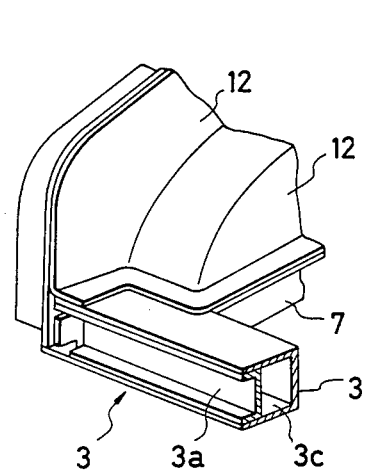
FIG. 6 is a fragmental perspective view illustrating a front cross member and its associated parts.
Figure 7:
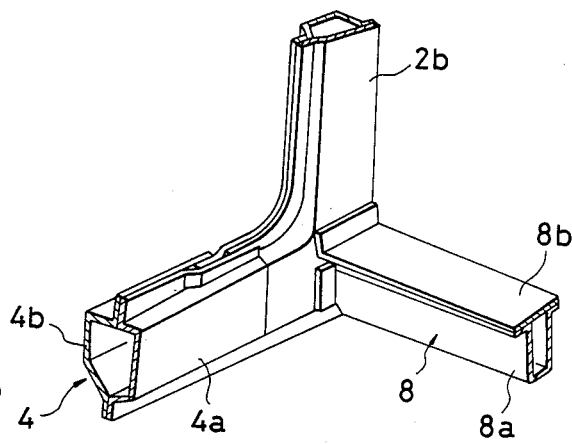
FIG. 7 is a fragmental perspective view illustrating a side sill and its associated parts.
Figure 8:
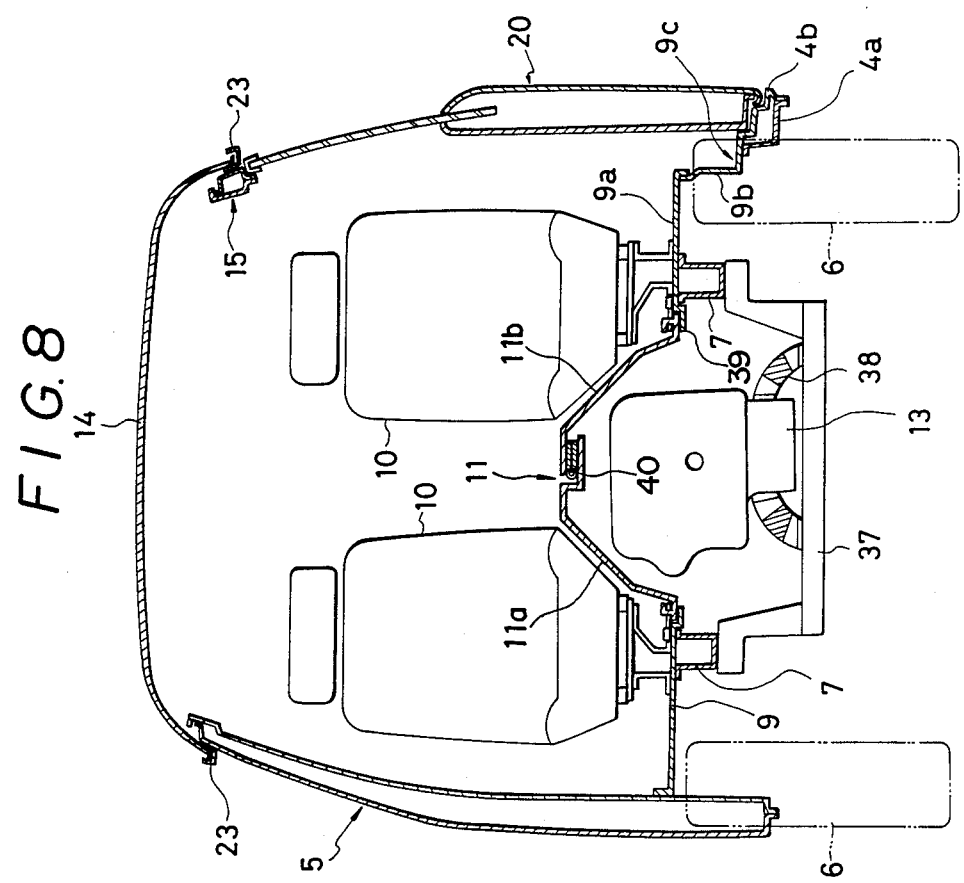
FIG. 8 is a vertical sectional view taken along line C—C in FIG. 2.

As will be seen from FIGS. 1 to 3, a front body structure in accordance with the present invention is applicable to a cab-over type motorcar as constructed in a one-box type. A car body indicated by reference numeral 1 exhibits such a configuration that a nose portion is elongated forwardly by a relatively long distance. A pair of front pillars 2 are provided at the front sides of the body 1 and extend along the outer shape of the body. The upper end of each front pillar 2 is joined to the fore end of a respective roof rail 15 which is connected to each side end of a roof 14, and as shown in FIG. 8, a rain rail 23 is attached to the outside of each roof rail 15. As shown in more detail in FIG. 4 and FIG. 5, the front pillar 2 is joined to a wheel apron 12 having a tire housing 12a, and a closed space is defined within the pillar 2 to increase strength. The lower part of the front pillar 2 is bifurcated in the longitudinal direction along the side surface of the body 1 to constitute a fore bifurcated pillar or branch 2a and a rear bifurcated pillar or branch 2b. The fore branch 2a extends downwardly and forwardly from the bifurcating point so that it forms a substantially linear extension of the upper part of the pillar 2. The lower ends of the fore branches 2a are connected to the respective ends of a front cross member 3 which extends in the transverse direction of the body 1 at the fore end thereof. As shown in FIG. 6, the front cross member 3 is formed by accommodating one U-shaped member 3a in another U-shaped member 3b of larger dimension whereby a closed space 3c is defined therebetween for increasing strength.

Figure 9:
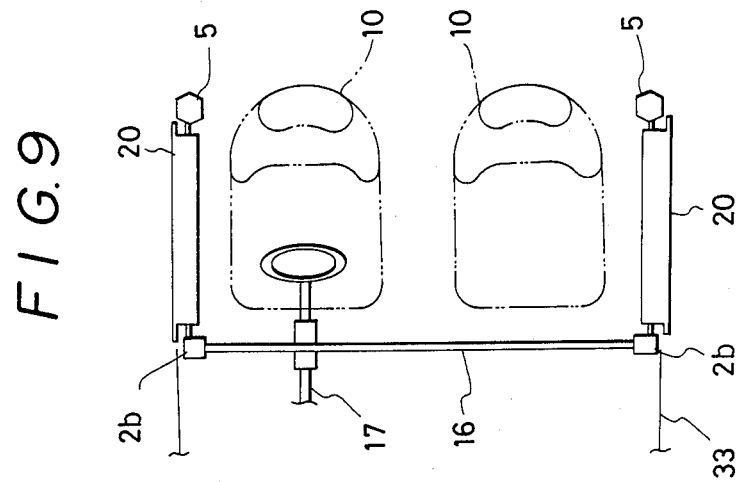
FIG. 9 is a fragmental plan view of the structure as seen along line B—B in FIG. 1.

On the other hand, the rear branch 2b extends downwardly from the bifurcating point in the substantially vertical direction and is connected at its lower end to the fore end of a side sill 4 that extends in the longitudinal direction along the lower portion of each side of the body 1. The lower part of the rear branch 2b exhibits a substantially arched shape approximate to a configuration of the rear upper part of a front tire 6. As shown in FIG. 9, a steering support frame 16 is bridged between the upper portions of the rear branches 2b and extends substantially linearly in the direction of the width of the body to support a steering shaft 17 thereon.

The fore end portions of the side sills 4 are connected to one another via a reinforcing cross member 8 extending in the direction of the width of the body (FIG. 2). As seen from FIG. 7, the reinforcing cross member 8 is made by connecting a U-shaped lower member 8a to a flat plate-shaped upper member 8b to confine a closed space therebetween. Also, the side sill 4 is composed of a side sill inner member 4a and a side sill outer member 4b joined together along the longitudinal direction of the body 1 in such a manner as to define a closed space therebetween for the purpose of increased strength.

Referring again to FIG. 1 and FIG. 2, center pillars 5 project substantially upright from the side sills 4 at positions in the proximity of the longitudinal center of the body 1, and each front door opening 18 is defined between the center pillar 5 and the rear branch 2b. An upper end of the front door opening 18 is defined by the roof rail 15 and the upper part of the front pillar 2, while a lower end of the same is defined by the side sill 4. The fore end of a front door 20 is pivotally attached to the rear branch 2b via upper and lower hinges 19. A door striker 21 is fixedly secured to the substantially vertical center of the center pillar 5 so that when the front door 20 is closed, its rear end is locked in a closed state by means of the door striker 21.

Each front tire 6 is disposed in an area between the fore end of the side sill 4 and the front cross member 3, that is, in an area between the fore branch 2a and the rear branch 2b of the front pillar 2. A pair of spaced front side frames 7 are provided in an area between the front tires 6 and extend longitudinally in the lower portion of the body 1, these frames 7 being symmetrical with respect to the longitudinal axis of the body. The fore ends of the front side frames 7 are connected to the front cross member 3 near the respective ends thereof, while the rear parts of frames 7 extend to the rear portion of the body 1. The front side frames 7 and the front cross member 3 are joined to each other via reinforcing members 22 obliquely extending near the direct connecting portions. The front side frames 7 are also connected to the side sills 4 through the reinforcing cross member 8 which is joined to the front side frames 7 at intersecting points.

Fore and rear support cross members 26 and 27 extend in the direction of the width of the body 1 and connect the fore portions of the front side frames 7 to each other. As shown in FIG. 1 and FIG. 5, a lower arm 28 of a double wishbone constituting one suspension member is attached to the ends of the support cross members 26 and 27 while an upper arm 29 is supported on the upper surface of the front side frame 7. A knuckle arm 30 is held by the upper arm 29 and the lower arm 28 and supports the front tire 6. The side end of a front panel 31 is secured to the front pillar 2 to which a fender 33 is also connected via a bracket 32.

The rear portions of the front side frames 7 are interconnected via a support cross member 37 which extends in the direction of the width of the body and on which an engine 13 is rubber-mounted with the aid of engine mounts 38, as seen from FIG. 8.

Provided above the front side frames 7 is a floor 9 on which a pair of independent front seats 10 are mounted between the front door openings 18. A part of the floor 9 located between the front seats 10 is formed with an opening 39 for accommodating the engine 13 therethrough, and the upper part of the engine 13 projects from the opening 39. This projecting part is concealed by a trapezoidal member 11 which comprises a pair of covers 11a and 11b hinged together at their inner end. The outer ends of each cover is secured to the floor 9 defining the opening 39 in a detachable manner so that, when desired, these covers can be rotated about a hinge 40 in order to enable an engine servicing through the opening 39. The front seats 10 are slidable along the longitudinal direction of the body 1 and can be moved to the frontmost position where they permit the covers 11a, 11b to move into the open position. A portion of the floor 9 extending between the front door openings 18 is composed of a seat supporting area 9a, a vertical section 9b extends downwardly from each side end of the seat supporting area 9a, and a step area 9c extends substantially horizontally from the lower end of each vertical area 9b onto the upper surface of the respective side sill 4. The vertical area 9b and the step area 9c are formed by an extension of the side sill outer member 4b.

As will be understood from the foregoing description, a rigidity of the front body of a cab-over type motorcar is increased by the above structure in which the lower part of each front pillar 2 is bifurcated into the fore branch 2a and the rear branch 2b, the front branch being connected to the front side frame 7 via the front cross member 3 while the rear branch is connected to the side sill 4. The increased rigidity is accomplished by the fact that both of the side sills 4 an the front side frames 7 extend in the longitudinal direction of the body 1 and therefore have a large magnitude of strength against shock imparted to the motorcar from the forward direction and from the forwardly slantwise direction. Accordingly, the fore and rear branches 2a and 2b connected to the front side frames 7 and the side sills 4, respectively, are of improved ridigity. This permits a front nose of the cab-over car to be elongated forwardly with maintaining sufficient strength.

In addition, since the front tires are located between the fore and rear branches 2a and 2b, it follows that the front tires 6 assume their positions in front of the seats 10. This results in a removal of projections which exist in the conventional structure and are positioned sidewardly of the front seats 10 for defining front tire houses, and the floor area surrounding the seats 10 becomes flat except at the cover 11.

While the present invention has been described above with respect to its preferred embodiment, it should of course be understood that it should not be limited only to the above embodiment, but that various changes or modifications may be made in a suitable manner without any departure from the spirit and scope of the invention as defined by the appended claims.

What is claimed is:

1. In a cab-over type motor vehicle in which a front seat is mounted on a floor at a position above an engine, a front body structure thereof comprising:

a front cross member extending in the transverse direction of the vehicle body at the fore end thereof;

a pair of side sills extending in the longitudinal direction of the vehicle body along respective sides of said floor;

a pair of front side frames extending substantially horizontally in the longitudinal direction of the vehicle body along respective side portions of said floor, each said front side frame having a front portion extending beyond the front end of the respective said side sill, said front portion being offset inwardly of the remaining portion of said front side frame, and the fore end of said front side frame being connected to said front cross member at a position spaced substantially inwardly from the respective end thereof;

a pair of front pillars extending in the vertical direction of the vehicle body at respective front side portions thereof, the lower portion of each said front pillar being bifurcated in the longitudinal direction of the vehicle body into a fore branch and a rear branch, said fore branch being connected at the lower end thereof to the respective said end of said front cross member, and each said rear branch being connected at the lower end thereof to the respective said side sill; and a pair of front tires, each said tire being disposed between said fore and rear branches of a respective said front pillar lower portion.

2. A structure as claimed in claim 1, wherein each said fore branch includes a slant portion extending downwardly and forwardly from a point at which the respective said front pillar is bifurcated, and each said rear branch extends substantially vertically from the said respective bifurcating point.

3. A structure as claimed in claim 2, wherein said rear branch includes an arched lower portion adjacent the rear upper part of the respective said front tire.

4. A structure as claimed in claim 2, further comprising a reinforcing cross member extending transversely between said side sills and joined thereto, said reinforcing cross member intersecting said front side frames and also joined thereto at intersecting portions.

5. A structure as claimed in claim 2, further comprising a pair of roof rails extending longitudinally along the respective sides of a roof, and a pair of center pillars each joined at an upper end thereof to a respective said roof rail and at a lower end thereof to a respective said side sill, and wherein the upper end of each said front pillar is connected to the fore end of the respective said roof rail to define a front door opening in cooperation with said center pillar and said side sill.

6. A structure as claimed in claim 5, further comprising a pair of front doors for closing said front door openings, and wherein each said rear branch includes fixed thereto upper and lower hinges for securing the fore end of the respective said front door, and each said center pillar has fixed thereto a door striker for maintaining the respective said front door in a closed position.

7. A structure as claimed in claim 5, wherein said front seat is arranged on said floor at a position laterally aligned with said front door opening.

8. A structure as claimed in claim 7, wherein said front seat comprises a pair of independent seats arranged side by side, and further comprising an opening formed through said floor between said pair of seats for providing access of the engine therethrough, and a cover member detachably secured to said floor for closing said opening and enclosing a part of the engine projecting from said opening.

9. A structure as claimed in claim 8, wherein said floor extending between said front door openings includes a seat support area for supporting said front seats thereon, a pair of vertical areas each extending downwardly from a respective side of said seat support area, and a pair of step areas each extending outwardly from a lower end of the respective said vertical area to the upper surface of the respective said side sill.

10. A structure as claimed in claim 2, further comprising a steering support frame extending substantially linearly between said rear branches and joined at the ends thereof to upper portions of said rear branches, and a steering shaft supported on said steering support frame.

11. A structure as claimed in claim 1, wherein each said rear branch includes a lower portion formed in an arched shape substantially corresponding to a configuration of the rear upper part of the respective said front tire.

12. A structure as claimed in claim 1, wherein each said fore branch extends substantially in alignment with the upper portion of the respective said front pillar.

13. A structure as claimed in claim 1, further comprising a pair of reinforcing members each joined at one end thereof to a respective said front side frame and at the other end thereof to said front cross member.

14. A structure as claimed in claim 1, further comprising a support cross member extending transversely between said front side frames and joined thereto for supporting a vehicle power train or suspension members.

15. In a cab-over type motor vehicle in which a front seat is mounted on a floor at a position above an engine, a front body structure thereof comprising:

a front cross member extending in the transverse direction of the vehicle body at the fore end thereof;

a pair of side sills extending in the longitudinal direction of the vehicle body along respective sides of said floor;

a pair of front pillars extending in the vertical direction of the vehicle body at respective front side portions thereof, the lower portion of each said front pillar being bifurcated in the longitudinal direction of the vehicle body into a fore branch and a rear branch, said fore branch being connected at the lower end thereof to said front cross member, and each said rear branch being connected at the lower end thereof to the respective said side sill; and a pair of front tires, each said tire being disposed between said fore and rear branches of a respective said front pillar lower portion, each said front tire being positioned as viewed from above substantially within the respective said fore and rear branches.

16. A structure as claimed in claim 15, wherein each said fore branch includes a slant portion extending downwardly and forwardly from a point at which the respective said front pillar is bifurcated, and each said rear branch extends substantially vertically from the said respective bifurcating point.

17. A structure as claimed in claim 16, wherein said rear branch includes an arched lower portion adjacent the rear upper part of the respective said front tire.

18. A structure as claimed in claim 16, further comprising a pair of front side frames extending in the longitudinal direction of the vehicle body along respective side portions of said floor, and wherein said front cross member is connected to fore ends of said front side frames.

19. A structure as claimed in claim 18, further comprising a pair of reinforcing members each joined at one end thereof to a respective said front side frame and at the other end thereof to said front cross member.

20. A structure as claimed in claim 16, further comprising a support cross member extending transversely between said front side frames and joined thereto for supporting a vehicle power train or suspension members.

21. A structure as claimed in claim 16, further comprising a reinforcing cross member extending transversely between said side sills and joined thereto.

22. A structure as claimed in claim 21, further comprising a pair of front side frames extending longitudinally along respective side portions of said floor and connected at fore ends thereof to said front cross member, and wherein said reinforcing cross member intersects said front side frames and is joined thereto at intersecting portions.

23. A structure as claimed in claim 16, further comprising a pair of roof rails extending longitudinally along respective sides of a roof, and a pair of center pillars each joined at an upper end thereof to a respective said roof rail and at a lower end thereof to a respective said side sill, and wherein the upper end of each said front pillar is connected to the fore end of the respective said roof rail to define a front door opening in cooperation with said center pillar and said side sill.

24. A structure as claimed in claim 23, wherein said front seat is arranged on said floor at a position laterally aligned with said front door opening.

25. A structure as claimed in claim 24, wherein said front seat comprises a pair of independent seats arranged side by side, and further comprising an opening formed through said floor between said pair of seats for providing access of the engine therethrough, and a cover member detachably secured to said floor for closing said opening and enclosing a part of the engine projecting from said opening.

26. A structure as claimed in claim 24, wherein said floor extending between said front door openings includes a seat support area for supporting said front seats thereon, a pair of vertical areas each extending downwardly from a respective side of said seat support area, and a pair of step areas each extending outwardly from a lower end of the respective said vertical area to the upper surface of the respective said side sill.

27. A structure as claimed in claim 16, further comprising a steering support frame extending substantially linearly between said rear branches and joined at the ends thereof to upper portions of said rear branches, and a steering shaft supported on said steering support frame.

28. A structure as claimed in claim 27, further comprising a pair of front doors for closing said front door openings, and wherein each said rear branch includes fixed thereto upper and lower hinges for securing the fore end of the respective said front door, and each said center pillar has fixed thereto a door striker for maintaining the respective said front door in a closed position.

29. A structure as claimed in claim 15, wherein each said rear branch includes a lower portion formed in an arched shape substantially corresponding to a configuration of the rear upper part of the respective said front tire.

30. A structure as claimed in claim 15, wherein each said fore branch extends substantially in alignment with the upper portion of the respective said front pillar.

* * * * *